United States Patent [19]

Myréen et al.

[11] 4,096,062
[45] Jun. 20, 1978

[54] METHOD AND DEVICE FOR SEPARATION OF SUSPENDED MATERIAL FROM A FLUID FLOW

[75] Inventors: Bertel Myréen; Ulf Nylund, both of Turku, Finland

[73] Assignee: Paraisten Kalkki Oy - Pargas Kalk AB, Finland

[21] Appl. No.: 728,318

[22] Filed: Sep. 30, 1976

[30] Foreign Application Priority Data

Oct. 6, 1975 Finland .................................. 752784

[51] Int. Cl.² .............................................. B01D 33/00
[52] U.S. Cl. ...................................... 210/77; 162/348; 210/324; 210/400
[58] Field of Search ................. 210/77, 400, 401, 406, 210/324, 327, 330, 359; 162/348–351; 209/307

[56] References Cited

U.S. PATENT DOCUMENTS

| | | |
|---|---|---|
| 1,789,425 | 1/1931 | Cabrera .......................... 210/400 X |
| 3,347,378 | 10/1967 | Arnold et al. ................... 210/400 X |
| 3,506,128 | 4/1970 | Pashaian et al. ...................... 210/400 |
| 3,677,411 | 7/1972 | Ishigaki .............................. 210/401 X |
| 3,812,971 | 5/1974 | Yamamoto ........................... 210/327 |

*Primary Examiner*—William A. Cuchlinski, Jr.
*Attorney, Agent, or Firm*—Bucknam and Archer

[57] ABSTRACT

Suspended solid particles are separated from a fluid flow by dividing the flow into partial fluid flows in flow channels having an upper filter surface travelling upstreams and a lower filter surface travelling downstreams, controlling the flow velocity in the channels such that the flow is turbulent but at the same time low enough to allow for sedimentation of the suspended material to form a clear top layer off so that more than half of the liquid fed to the channel is filtered through the upper filter surface, suctioning less than half of the liquid fed into the channel through a sediment formed on the lower filter surface, and finally removing the sediment from the lower surface.

13 Claims, 4 Drawing Figures

METHOD AND DEVICE FOR SEPARATION OF SUSPENDED MATERIAL FROM A FLUID FLOW

BACKGROUND OF THE INVENTION

This invention relates to a method and an apparatus for continuous separation of suspended material from fluids. The apparatus can be used for said purposes when the fluid, which usually is water, continuously is fed to the apparatus and the suspended material is either in the fed fluid flow or entirely or partly through addition of chemicals produced in the apparatus itself. Two flows are continuously obtained from the apparatus, hereinafter called the clear water flow and the slurry flow. The clear water flow contains the major part of the fed fluid and only an insignificant part of the suspended material. The major part of the suspended material is in the slurry flow which has a proportionately high dry matter content.

This kind of separation can be achieved by sedimentation in case the density of the suspended material is higher than the density of the fluid. In the opposite case the separation takes place by flotation. If there exists a difference in density between the suspended material and fluid, separation can also be achieved with the aid of centrifugal force. Filtration is another common method for separation of suspended material from fluid flows. The separation mechanisms have been used in prior known apparatuses such as sedimentation basins, flotation apparatuses, centrifuges, cyclones, and fluid filters.

In spite of the variety of apparatuses that exist for separating suspended material from fluid flows, it has become apparent that none of the prior known apparatuses is without considerable drawbacks in special cases. Such cases are found e.g. when purifying heavy waste water flows in which the particle size of the suspended material is small and its density almost equals that of water. As an other example may be mentioned the recovery of fibres from the white water system of papermaking machines. In such cases effective separation of the suspended material from the fluid flow, with the aid of sedimentation, requires long retention periods for the fluid in the sedimentation apparatus which then attains uneconomically large dimensions. By shortening the sedimentation route by fixed built-in devices of different types the retention period can be shortened to a certain extent. However, the slurry flow is taken out of the sedimentation apparatuses by pumping together with the fluid which causes the dry matter content of the slurry to be low and usually it has to pass secondary dewatering in another apparatus e.g. a centrifuge or a band filter press in order to be handled as solid material.

Suspended particles can be separated from a fluid by filtering irrespective whether there exists a difference in the density of the particles and fluid or not. In a filter the slurry flow is usually removed above the free fluid surface in the apparatus. Therefore the slurry has a relatively high dry matter content. In a filter the ensuing filter cake constitutes the filtering medium. This restricts the possibilities to use filters to separate suspended material from large fluid flows as the ensued filter cake being microporous and, in addition to that, compressible, constitutes a great flow resistance to the fluid. As the entire fluid flow shall pass the filter cake, unrealistic large filter surfaces are required, from the economic point of view, if the fluid flow is big.

Through the Swedish Pat. No. 333,721 it is known a device for separation of suspended material from a fluid by means of flow channels for the suspension with channel walls mobile in the longitudinal direction of the channel for bringing forth a velocity gradient in the suspension, whereby the suspended material tends to migrate towards areas in the suspension where the velocity gradient is less so that a clear solution and a thickened solution is received.

This known device has, however, a far too low capacity for any practical use. In order to provide a velocity gradient the fluid flow should be laminar, which means that the flowing velocity remains so low that one cannot achieve any in practice useful separation capacity with this device.

The object of the present invention is thus to provide a method and a device for separation of suspended material from a fluid flow, in which the former disadvantages have been eliminated and with a good capacity.

SUMMARY OF THE INVENTION

According to the present invention the flow velocity of the suspension divided between channels having at least partly superimposed filter surfaces is controlled turbulent but low enough to enable the particles to sediment on the lower filter surface which travels in the main direction of the flow. More than half of the liquid entering the channel is filtered off a clear top layer of the flow, formed upon sedimentation, through the upper filter surface travelling countercurrently to the main direction of the flow in the channel. Less than half of the liquid is suctioned through the sediment on the lower filter surface and finally the sediment is detached from the lower filter surface.

DESCRIPTION OF THE PREFERRED EMBODIMENT

Figure 1:
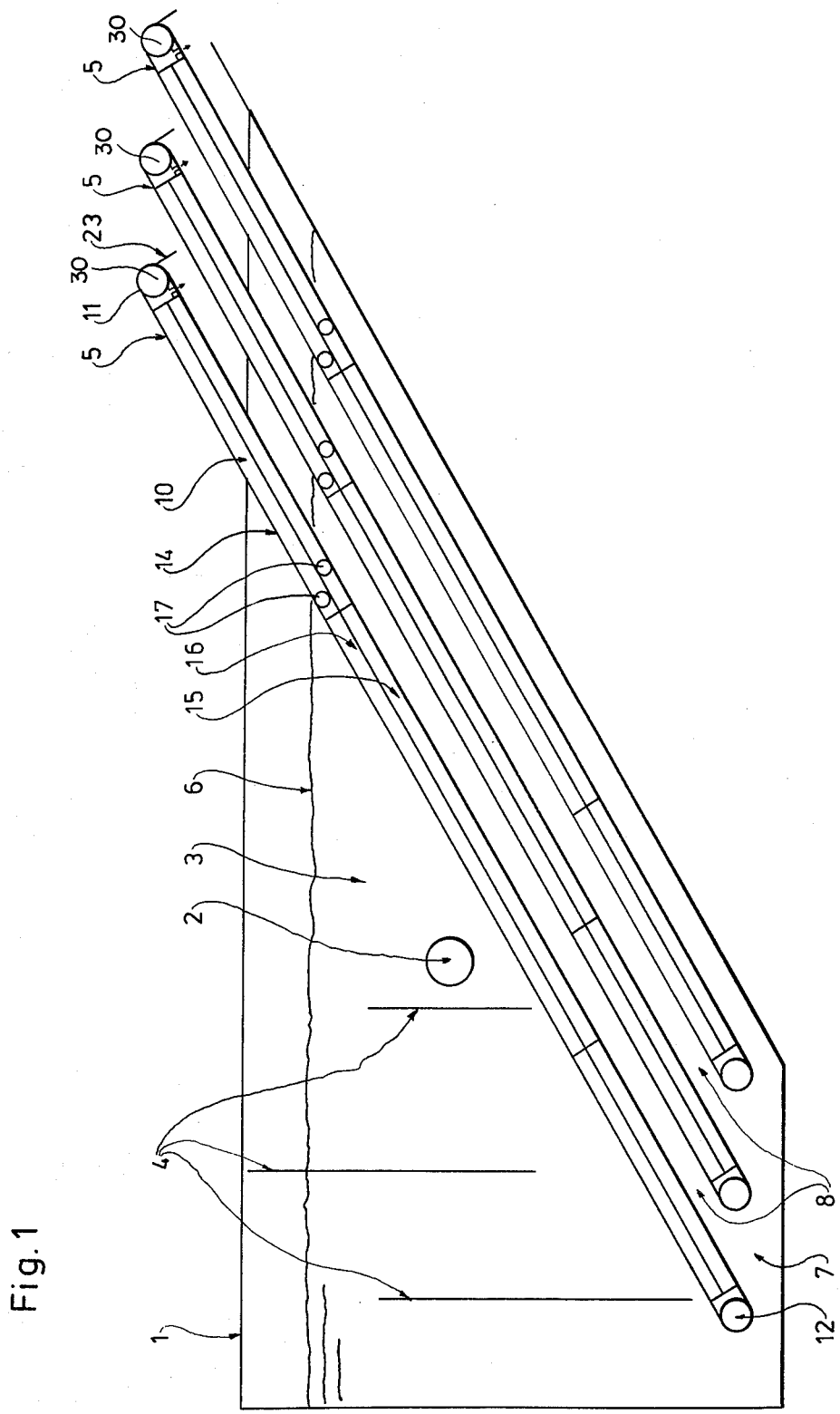
FIG. 1 shows a vertical longitudinal section of the apparatus and FIG. 2 shows a front view of the apparatus as well as its external piping.

In these figures 1 is a vessel or vat into which the fluid, from which solid suspended particles shall be separated, is conveyed through inlet pipe 2. This inlet pipe leads to an elective spot in vat section 3 which can be equipped with baffles 4 for the flow, and to which section chemicals can be fed in order to bring about precipitation or flocculation of the suspended particles in the fluid into bigger agglomerates. In vat 1 there are two or more apparatus elements 5, hereinafter called cassettes and placed so that one end of every cassette is under fluid surface 6 while the other end is above the fluid surface 6 in the vat. FIG. 1 shows three cassettes of that kind, however, their number may be up to several dozens in the same vat.

Figure 3:
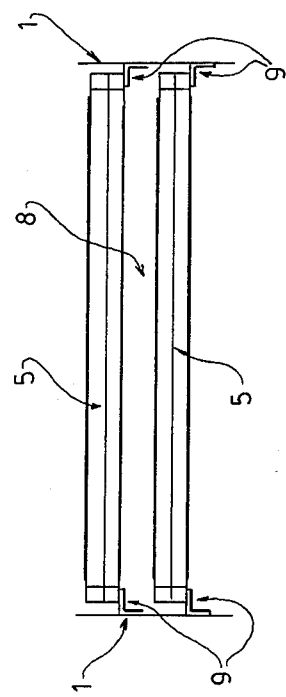
FIG. 3 shows cross-section of a flow channel typical for the apparatus.

Between the lower end of the cassettes and the vat bottom there is a free flow channel 7 extending over the entire width of vat 1. Through this flow channel the fluid from vat section 3 can flow to flow channels 8, formed over the entire vat width, which channels are located between every two successive cassettes. The cassettes rest on supports 9, attached to the longitudinal walls of the vat. These supports prevent also the fluid from flowing between the longitudinal wall and the cassette from a flow channel 8 to an other. The design of the flow channels appears from FIG. 3 where a cross-section of a typical flow channel is shown.

The cassette 5 may, but need not necessarily, be placed in the vat 1 so that each cassette can be lifted up from the vat irrespective of whether the other cassettes are in position or not. Likewise, the cassettes may be designed as identical units which are inter-changeable with each other.

Figure 4:
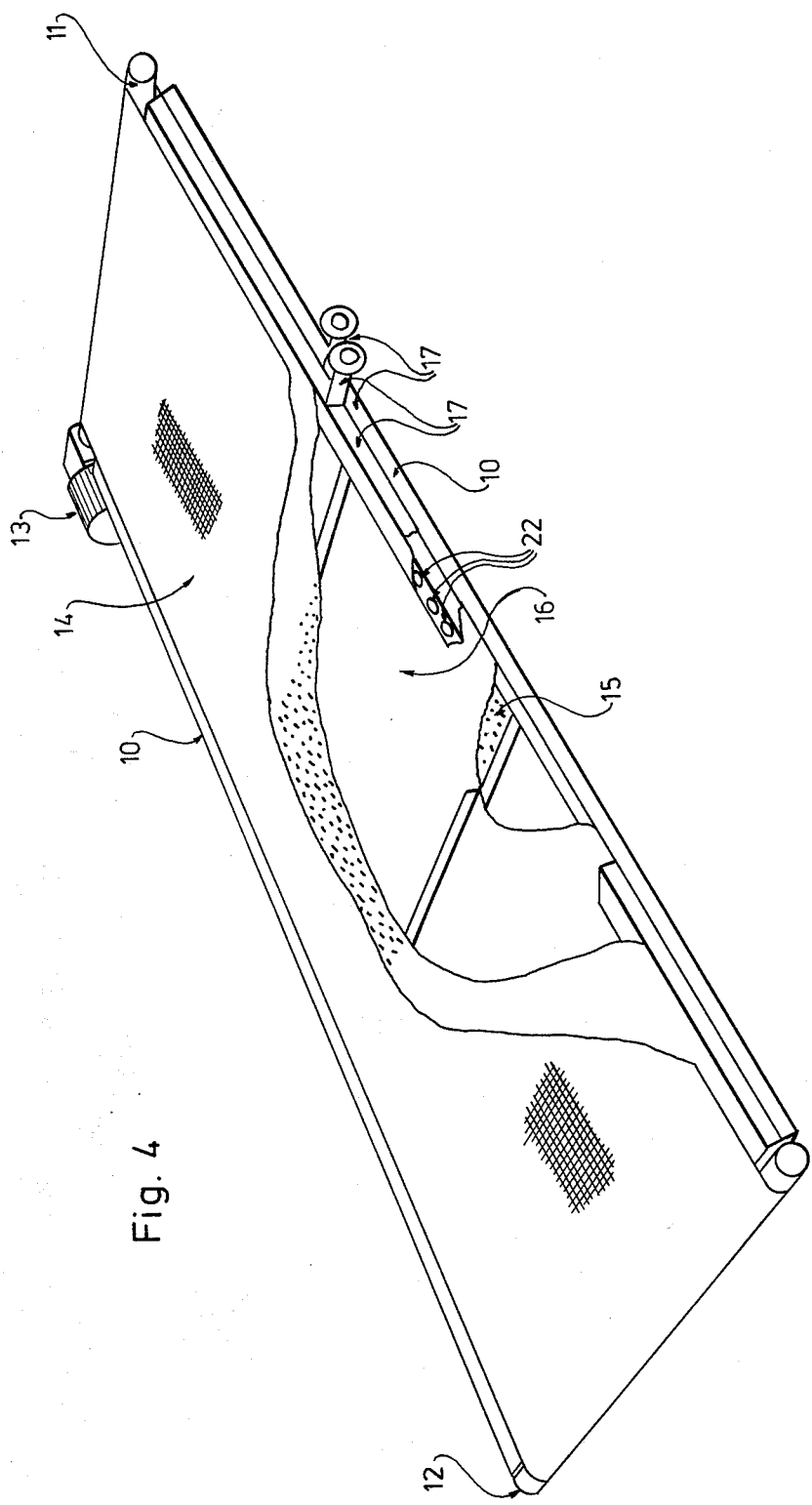
FIG. 4 shows the fundamental construction of the special apparatus elements that form limiting walls for flow channels and constitute essential parts of the present apparatus. However, these drawings shall only be considered as examples of a technical embodiment of the apparatus, as even other embodiments, in which the same function can be performed, may come into consideration.

The fundamental construction of the cassettes 5 is explained with reference to FIGS. 1 and 4. Each cassette consists e.g. of a frame 10 constructed of pipes and plate and supporting two rolls 11 and 12 placed at each end of the cassette. The roll 11 located at the end of the cassette which comes above the fluid level 6 in the vat 1, is driven by a driving machinery 13, which can be an electric motor mounted on every cassette separately, or, a common gear for the rolls of several cassettes. The roll 12 located below the fluid level in the vat is an undriven turner cylinder. Over these cylinders an endless filter cloth 14 is guided made e.g. as a plastic or metal wire. This filter cloth is driven round by the roll 11 with the aid of its driving gear 13, so that the upper section moves slantingly upwards and the other section moves slantingly downwards along the cassette when it is in its place in the vat 1. The filter cloth is so wide that it extends over the entire cassette to the supports 9 of the cassette, however, without touching the supports. Any special seal of the filter cloth edge against the cassette need not be arranged in other respects.

At least two suction boxes 15 and 16 are installed in the cassette frame under the filter cloth. Through a great number of openings the fluid can flow into suction box 15 through the filter cloth from flow channel 8 located under said cassette. Correspondingly, fluid can flow into suction box 16 through the filter cloth and through a great number of openings covered by the filter cloth from flow channel 8 located above said cassette. Every suction box has an open connection 22 each to its pipe 17, which can partly be included in the frame construction of the cassette and which ends outside the wall of vat 11. Otherwise the suction boxes are separated by closed walls.

Figure 2:
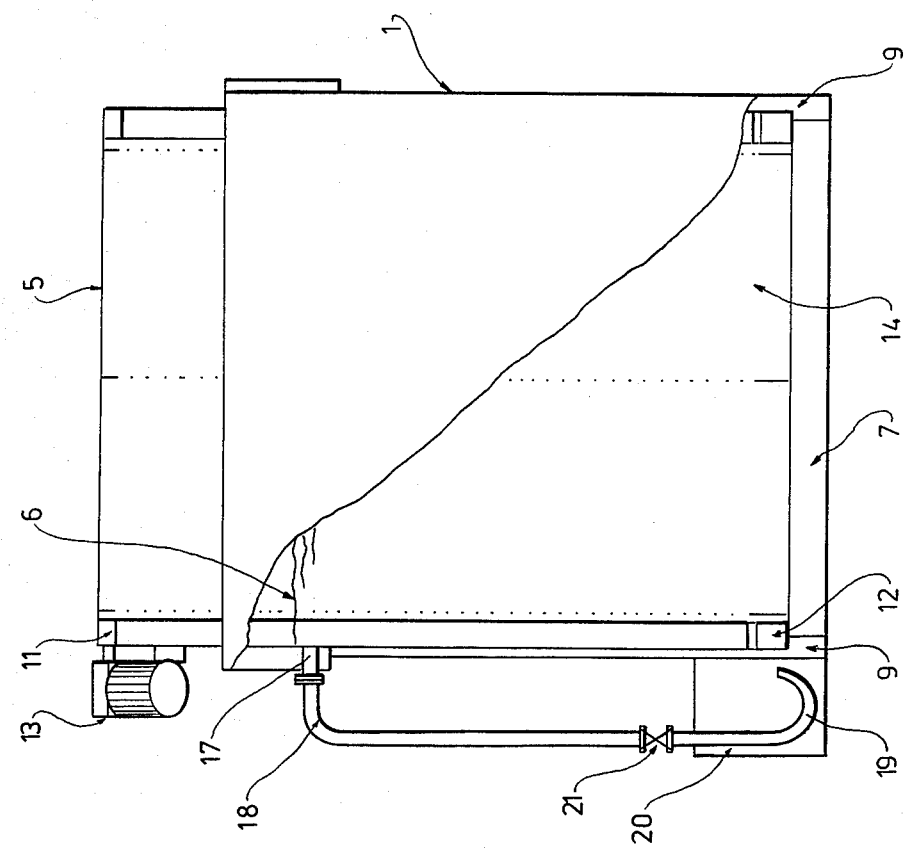

FIG. 2 shows how every pipe 17 is connected to chute pipe 18 ending, through a drain trap 19, into an open channel 20 on a level which is lower than the free fluid level 6 in vat 1. Valves 21 can be provided in the pipes. Alternatively, the pipes 18 can be connected to a closed piping from which the fluid can be brought to flow by means of self-draining or pumping. As an alternative to the open channel 20, closed piping can be placed on a level which is independent of the free fluid level in vat 1.

In the part located above the free fluid level 6, every cassette is provided with a device for slurry removal from the filter cloth, e.g. with a scraper 23 or a device for blowing compressed air through the filter cloth from the inside outwards. However, this device may even be excluded.

The separation method shall be explained with reference to FIGS. 1 to 4 and the reference numerals to the different apparatus parts. Through the piping 2 the vat section 3 is supplied with the fluid containing the suspended particles or from which the suspended particles can be produced with the aid of the addition of chemicals. In the latter case, the addition of chemicals takes place in the vat section 3, which can be provided with a stirrer and plates directing the flow. From this section of the vat, the fluid with the suspended particles flows down into the flow channel 7 and from there up into the flow channels 8 between the cassettes 5 in the apparatus. The number of such cassettes in the apparatus and accordingly also the flow channels 8 shall be selected in relation to the fed fluid flow in such a manner that the flow velocity in every channel becomes sufficiently low so that there is time for sedimentation of the solid particles downwards towards the underlaying filter cloth to take place. As a result of the sedimentation, next to the under side of the cassette above a fluid layer is formed containing only a small part of the suspended material. From this layer the fluid is filtered through the filter cloth of the overlaying cassette into its suction box 15 whereat a difference in pressure over the filter cloth is produced by the fact that the fluid outlet of the suction box opens up through the chute pipes 18 on a lower level than the free fluid surface 6 in the vat 1. The flow volume passing through each suction box can be regulated with valves 21 and hereby into every flow channel 8 in the apparatus. When the main part of the solid particles in the fluid filtered into the suction boxes 15 has been removed by sedimentation from this part of the fluid, no thick filter cake with great flow resistance is formed at this filtering. Thus the main part of the fed fluid flow can be filtered from the clear fluid layer of the sedimentation.

Because the filter cloth 14 on the upper side of lower one of the cassettes 5, which borders vertically the flow channel 8, through rotation of the roll 11 moves upwards, the material sedimenting on the filter cloth is also conveyed upwards upon the underlaying cassette. Hereat the sediment bed on the filter cloth passes over the suction box 16 in the cassette, whereby the difference between the pressure in the flow channel 6 and the suction box 16 compacts the sediment on the filter cloth and simultaneously a smaller part of the fluid filters through the forming filter cake. The compacted filter cake is brought by the movement of the filter cloth upwards above the fluid surface 6 in the vat 1 and is detached from the filter cloth with e.g. a scraper 23 and transported by the filter cloths of the following cassettes out of the apparatus.

More water can be removed from the pores of the thus formed filter cake by suctioning air through the filter cake. This, in itself well-known technique can but need not be utilized in this apparatus. If this is done, one additional suction box is installed in the cassette in the part located above the free fluid surface 6. The suction box is connected to a low pressure system which causes air suctioning through the filter cake. This possibility has not been shown in FIGS. 1 - 4.

Tests performed with a prototype of the apparatus described here, have proved that when purifying different types of waste water the mean flow velocity in the channels 8 can be selected of the category 1 m/min, whereby such a clear layer is formed in the upper part of the flow channel that the main part of the fed water can be suctioned through the filter cloth to the suction box 15. A small part of the fed fluid flow can be filtered through the filter cake to the suction box 16, but this relatively small fluid flow is enough to compress the filter cake effectively so that it can travel with the filter cloth up above the fluid surface of the apparatus.

With this flow velocity the fluid flow is turbulent near the upper border surface of the flow channel where the filter cloth moves against the main flow direction of the fluid. Because of this a certain velocity gradient in the fluid flow cannot be maintained and is neither necessary nor desirable in the flow channels.

What is claimed is:

1. A method for separation of suspended solid particles from a fluid flow, whereby the fluid flow is divided into partial fluid flows in flow channels provided with an upper and a lower movable filter surface of which the upper filter surface runs against the main flow direction of the fluid and the lower in the main flow direction of the fluid, comprising maintaining the flow velocity of the fluid in the flow channels so high that the flow is turbulent but simultaneously so low that sedimentation of the suspended material takes place for the formation of a sediment and a clear top layer with a substantially reduced content of suspended material in each partial fluid flow; filtering off said clear top layer in an amount more than a half of the fluid fed to each flow channel through the upper filter surface; simultaneously suctioning less than a half of the fluid fed into the flow channel through said sediment and finally removing said sediment.

2. The method of claim 1, in which the sediment formed is transported above the free surface of the fluid before it is removed from the lower filter surface.

3. A device for separating suspended solid particles from a fluid flow comprising an open vat with side walls and an inlet for the suspension; a sequence of several at least partly superimposed inclined cassettes in the vat, which together with the side walls of the vat form several flow channels for the suspension and extend from a distance over the bottom of the vat to above the surface of the suspension; a frame having an upper and lower surface to more than two-thirds composed of a filter cloth; means for moving the filter cloth upwards along the upper surface of the cassette and downwards along the lower surface of the cassette, at least two suction boxes located under the filter cloth, having separate outlets, which suction boxes are open at the same time to the upper and lower surfaces, respectively, of the cassette for the withdrawal of fluid at the same time from the suspension through the filter cloth; the main part of the fluid being suctioned off through the filter cloth to the suction box which is open to the upper surface of the flow channel and a small part of the fluid being suctioned off through the suction box which is open to the lower surface of the flow channel and means for the removal of the sediment of solid particles from the filter cloth above the surface of the suspension.

4. The device of claim 3, in which the cassettes have such an inclination that the direction of travel of the filter cloth forms an angle of 10° to 60° to the horizontal.

5. The device in accordance with claim 3, in which the filter cloth which travels over the cassette surfaces adjacent to the flow channels is endless and guided over a roll at each end of the cassette, the upper roll having a driving device.

6. The device of claim 3, in which all cassettes are interchangeable in the vat and that every cassette can be mounted in or removed from the vat independent of whether the remaining cassettes are in place or not.

7. The device of claim 3, in which the cassettes are placed in the vat in such a manner that there ensues a fluid volume in the vat outside the flow channels with such a long average retention period for the fluid that chemical flocculation or precipitation of the material suspended in the fluid can occur.

8. The device of claim 3, comprising pipes through which the fluid can flow out from the suction boxes with an open outlet over an open flute on a lower level than the free fluid level in the vat and that every pipe next to this outlet is designed as a drain trap.

9. The device of claim 3, in which the outlets, through which the fluid can flow out from the suction boxes, is connected to a common closed piping.

10. The device of claim 8, in which in the pipes through which fluid can flow out from the suction boxes there are valves to adjust the fluid flow through the pipes.

11. The device of claim 3, in which in at least some cassettes there is a further suction box which is fully separated by partitions from the remaining suction boxes in the cassette, and that such a suction box is only connected by a plurality of apertures through the filter cloth to the surrounding air above the free fluid surface in the vat and that these suction boxes are connected to a common vacuum pump with pipes.

12. The device of claim 3, in which the means for removal of the main part of the solid particles transported up by the filter cloth from the flow channels is a scraper which extends over the entire width of the filter cloth.

13. The device of claim 3, in which the means for removal of the main part of the solid particles transported up by the filter cloth from the flow channels is an air duct having a small slit-formed opening which extends over the entire filter cloth width and through which slit air under pressure is blown through the filter cloth against the sediment.

* * * * *